United States Patent [19]

Hallstrom

[11] 4,184,587

[45] Jan. 22, 1980

[54] RECIPROCATING CONVEYOR AND MODULAR DRIVE UNIT THEREFOR

[76] Inventor: Olof A. Hallstrom, 1350 Hallstrom Rd., Tillamook, Oreg. 97141

[21] Appl. No.: 690,438

[22] Filed: May 27, 1976

[51] Int. Cl.² ............................................. B65G 25/00
[52] U.S. Cl. ..................................... 198/750; 414/525
[58] Field of Search ........................ 198/750, 773–775; 214/83.3; 414/525

[56] References Cited

U.S. PATENT DOCUMENTS

| 2,629,504 | 2/1953 | Peterson | 214/83.3 |
| 3,486,608 | 12/1969 | Rogers | 198/750 |
| 3,534,875 | 10/1970 | Hallstrom | 198/750 |

FOREIGN PATENT DOCUMENTS 1296087  5/1969  Fed. Rep. of Germany ........... 198/750

Primary Examiner—Joseph E. Valenza
Attorney, Agent, or Firm—Oliver D. Olson

[57] ABSTRACT

A modular framework, arranged to be installed in a main support frame for an elongated conveyor, supports at least three transverse drive beams for reciprocation in the longitudinal direction of the framework, each of the drive beams being connected to a source of power for independent reciprocation, the sources of power also being supported by the framework. A plurality of slat connectors are spaced apart transversely of the framework and are secured in groups one to each of the drive beams for longitudinal reciprocation therewith, each of the slat connectors serving to secure thereto an elongated conveyor slat arranged to extend the full length of the elongated conveyor. Slat guide members are mounted on the framework, as well as on the main support frame, in longitudinal alignment with the slat connectors, for guiding the slats in their longitudinal reciprocation.

2 Claims, 6 Drawing Figures

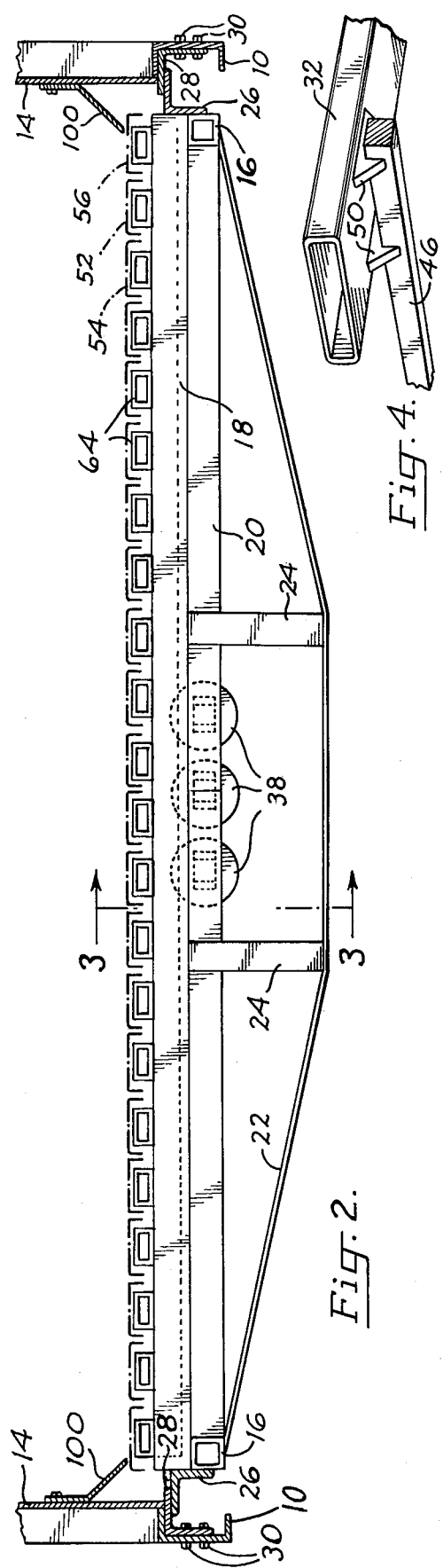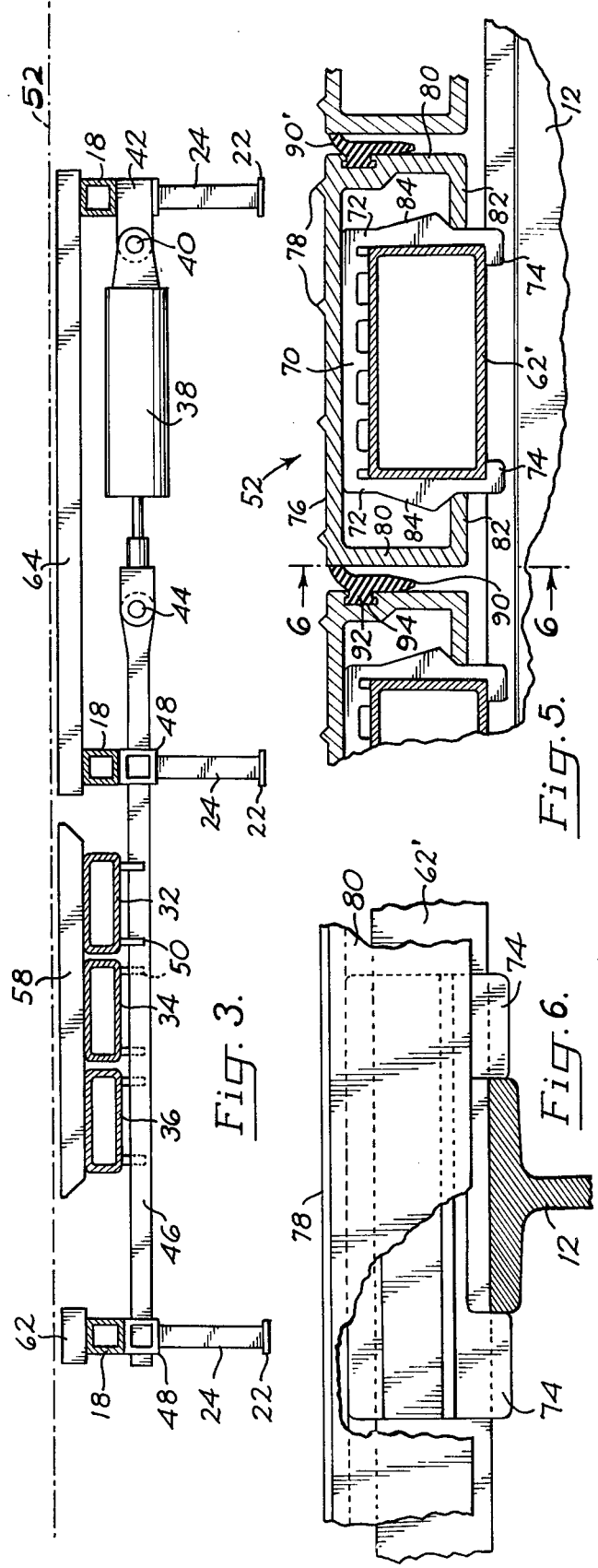

RECIPROCATING CONVEYOR AND MODULAR DRIVE UNIT THEREFOR

BACKGROUND OF THE INVENTION

This invention relates to reciprocating conveyors, and more particularly to a modular drive unit for incorporation into the elongated main frame support for an elongated reciprocating conveyor.

Reciprocating conveyors heretofore have been constructed as complete, integral units by unitary construction of all components. This procedure requires complete removal of old conveyors, whether they be elongated product conveyors within industrial facilities, or whether they form the bed of a mobile truck. In the latter instance it is sometimes necessary even to remodel the truck frame in order to form a bed as a reciprocating conveyor.

SUMMARY OF THE INVENTION

In its basic concept, this invention provides a module incorporating all components of a reciprocating conveyor except the elongated slats per se, the module being adapted for installation as a longitudinal section of an elongated main frame support for an elongated reciprocating conveyor.

It is by virtue of the foregoing basic concept that the principal objective of this invention is achieved; namely, to overcome the limitations and disadvantages of the reciprocating conveyors of the prior art.

Another important objective of this invention is the provision of a module of the class described which is adaptable for incorporation with speed and facility into a main elongated frame support, such as the frame support for a truck bed, with minimum modification of the frame support, for converting the latter to an elongated reciprocating conveyor.

A further important objective of this invention is the provision of a module of the class described which is of simplified construction for economical manufacture and which is adaptable for use in a wide variety of main frame supports.

Still another important objective of this invention is the provision of a modular drive unit of the class described, the components and assembly of which are capable of being tested for performance before installation into a main frame of a reciprocating conveyor.

A still further important objective of this invention is the provision of a reciprocating conveyor of the class described incorporating the modular drive unit of this invention.

The foregoing and other objects and advantages of this invention will appear from the following detailed description, taken in connection with the accompanying drawings of a preferred embodiment.

BRIEF DESCRIPTION OF THE DRAWINGS

FIG. 2 is a fragmentary view in transverse section taken on the line 2—2 in FIG. 1.

FIG. 3 is a longitudinal vertical section taken on the line 3—3 in FIG. 2.

FIG. 4 is a fragmentary perspective view showing the manner in which each transverse drive beam is secured to its source of reciprocating power.

FIG. 5 is a fragmentary sectional view, on an enlarged scale, taken on the line 5—5 in FIG. 1.

FIG. 6 is a fragmentary sectional view taken on the line 6—6 in FIG. 5.

DESCRIPTION OF THE PREFERRED EMBODIMENT

Figure 1:
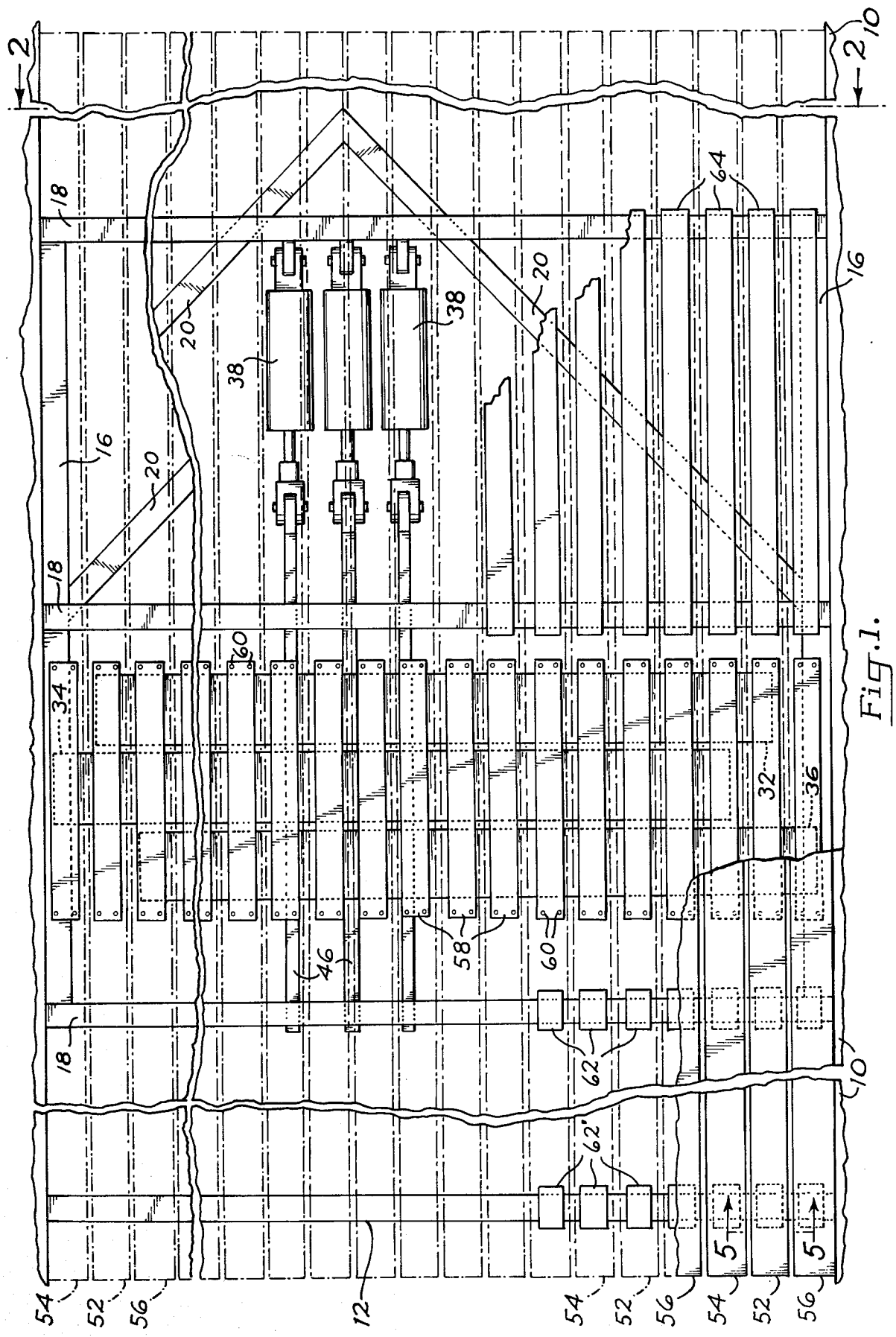
FIG. 1 is a fragmentary, foreshortened plan view of a main support frame having incorporated therewith a modular drive unit for a reciprocating conveyor embodying the features of this invention.

FIGS. 1 and 2 illustrate generally an elongated main frame which, for purposes of this invention, may serve to support an elongated reciprocating conveyor. The main frame includes a pair of laterally spaced, longitudinal side beams 10, illustrated to be channel-shape in cross section, secured together in properly spaced relation by means of a plurality of transverse beams 12, such as the I-beam illustrated in FIGS. 1 and 6.

This main frame may be the main supporting frame of a truck or trailer bed, as illustrated in applicant's copending application Ser. No. 496,523, filed Aug. 12, 1974 and entitled RECIPROCATING CONVEYOR. In such event, the upstanding walls 14 supported by the beams 10 constitute the side walls of the load carrying portion of the truck or trailer, as will be apparent.

On the other hand, the main frame components described may form an elongated frame within an industrial facility for supporting any form of longitudinal conveyor, such as those of the continuous belt, roller, or other form.

In either case, and as described more fully hereinafter, the conversion of the main frame to accommodate the present invention simply requires the removal of the article-supporting surface of the truck bed or conveyor, as the case may be.

In accordance with this invention, a modular drive unit is provided for incorporation into an elongated main frame as a longitudinal section thereof, in order to convert the main frame to an elongated reciprocating conveyor.

The modular drive unit includes a modular framework which, in the embodiment illustrated, includes a pair of laterally spaced, longitudinally extending side beams 16 and a plurality of longitudinally spaced transverse connecting beams 18. These are illustrated in the drawings in the form of box beams of substantially square cross section.

The rectangular configuration of the assembly of interconnected longitudinal and transverse beams is maintained by the angular stabilizing beams 20.

Means is provided for strengthening the framework assembly to minimize its downward deflection under load. For this purpose a plurality of bridge straps 22 extend transversely under the frame members 18 of the framework. The opposite ends of each strap is secured to the side beams 16 and the intermediate portion of the strap is displaced downwardly from the framework and connected to the associated beam 18 by means of a pair of uprights 24.

The modular framework is arranged to be installed as a longitudinal section in the main frame. This is accommodated, in the embodiment illustrated, by a pair of elongated angle irons 26 and 28 (FIG. 2) along each of the opposite longitudinal sides of the framework. The angle irons of each pair are secured together, as by welding, to form a substantially U-shaped mounting beam. The depending section of the inner portion of the inner angle iron 26 is secured to the abutting outer surface of the associated side beam 16 of the framework, as by welding, and the depending outer section of the outer angle iron 28 is secured to the elongated side channel beam 10 of the main frame, as by bolts 30.

The modular drive unit of this invention includes a plurality of transverse drive beam members mounted on the module framework in longitudinally spaced relation for reciprocation in the longitudinal direction of the framework. In the embodiment illustrated, three such transverse drive beams 32, 34 and 36 are illustrated, and they are disposed between the transverse frame members 18 of the framework. They are supported on the framework individually by separate sources of drive power by which each drive beam may be reciprocated independently of the others.

In the embodiment illustrated, there are three separate sources of drive power, one for each of the three drive beams. The source of drive power may be selected from a wide variety of well known devices, such as electrically or otherwise driven screws, rack and pinion assemblies and others. The preferred source, illustrated, comprises the three fluid pressure piston-cylinder units 38 supplied from a source, not shown, of hydraulic fluid under pressure delivered selectively to the opposite ends of the cylinder of each unit by suitable control valve mechanism, also not shown. Typical of the variety of power sources suitable for the purpose of this invention are those described in my U.S. Pat. No. 3,534,875 and in my copending applications, Ser. No. 496,523, filed Aug. 12, 1974 and Ser. No. 540,281 filed Jan. 10, 1975, now abandoned in favor of continuation application Ser. No. 707,877, filed July 22, 1976.

In the embodiment illustrated, the piston rod end of each cylinder is connected pivotally, as by means of a pivot pin 40, to a bracket 42 secured to the underside of the transverse frame member 18. The projecting end of the associated piston rod is connected pivotally, as by a pivot pin 44, to one end of an elongated drive rod 46 which is supported slidably in apertured guide blocks 48 underlying the beams 18.

Intermediate the ends of each of the drive rods 46 is mounted one of the transverse drive beams 32, 34, 36. Ad illustrated in FIGS. 3 and 4, the drive beam is connected to the drive rod by means of a pair of brackets 50 which project downward from the underside of the beam and are formed with channels into which to receive the rod. The rod is attached to the brackets by such means as welding.

It will be understood that the second and third transverse drive beams illustrated are secured one to each of the second and third drive rods associated with the corresponding second and third piston-cylinder units.

It will be appreciated from the foregoing that the assembly of transverse drive beams, piston-cylinder drive units and frame members of the module framework all are joined together as an integral unit, forming a modular drive unit.

Means is provided for securing to each drive beam at least one elongated conveyor slat member for extension in the longitudinal direction of the framework. In this regard, it is to be understood that an operable reciprocating conveyor may be formed by one group of at least two slat members arranged side by side and operable to move simultaneously in the outfeed direction and sequentially in the retract-direction. In accordance with applicant's earlier patent and co-pending applications described hereinbefore, it is preferred that at least one group of at least three slat members is provided for reciprocative movement in diverse manners, to achieve most effective and efficient operation of the conveyor.

In the embodiment illustrated, a multiplicity of slat members are provided, and they are arranged in a plurality of groups each having three slats 52, 54 and 56, inasmuch as the drive unit includes three transverse drive beam members and associated sources of drive power. Thus, the slats 52, 54 and 56 are secured to transverse drive beams 32, 34 and 36, respectively.

With reference particularly to FIGS. 1 and 3, the slat members are secured to the transverse drive beams through a plurality of slat connectors 58. These are disposed side by side in laterally spaced apart relationship across the framework and resting upon the upper surfaces of the three drive beam members 32, 34, 36. Certain ones of the slat connectors are secured to corresponding ones of the drive beam members for connecting certain ones of the slat members thereto for simultaneous reciprocation therewith. Thus, certain slat connectors interconnect the drive beam 32 and slats 52; every next adjacent slat connector interconnects the drive beam 34 and slats 54; and every next adjacent slat connector interconnects the drive beam 36 and slats 56. These attachments of the slat connectors each to an elongated conveyor slat member, are provided by bolts 60.

Means also is provided on the modular drive unit for guiding the elongated slat members in their reciprocative movement. Referring particularly to FIGS. 1 and 3, a short guide member 62 is secured to the left end transverse frame member 18 and the framework in longitudinal alignment with each of the slat connectors 58, while an elongated guide member 64 is secured to and spans the distance between the center and right end transverse frame members of the framework, in alignment with each of the slat connectors.

Moreover, additional slat guides 62' or 64' of similar type, also are mounted on transverse frame members of the main frame. One such arrangement is shown in FIGS. 1 and 6, wherein a plurality of short guide members 62' are secured at laterally spaced intervals to the upper surface of the transverse I-beam 12 of the main frame, with each guide member being in longitudinal alignment with the guide members on the modular drive unit.

In the embodiment illustrated, and best shown in FIG. 5, the slat guide members are in the form of rectangular box beams of suitable length. As illustrated, and as described in detail in copending application Ser. No. 496,523 mentioned hereinbefore, means is associated with these guide members for mounting the elongated slats for longitudinal reciprocation with minimal frictional resistance. Thus, an anti-friction bearing is mounted on each guide member. The bearing is made of synthetic thermoplastic resin such as polyethylene, etc., or other suitable material having a low coefficient to friction. It is substantially U-shaped in cross-section, having a top wall 70 and laterally resilient side walls 72, to overlap the top and sides of the guide beam 62'. The length of the bearing is greater than the width of the underlying transverse frame beam, shown as 12 in FIG. 6, and each of the opposite side walls of the bearing is provided with a pair of downwardly and inwardly extending lugs 74 spaced apart a distance slightly greater than the width of the underlying transverse frame beam. The sides of the bearing being laterally flexible, it may be installed upon the guide beam 62' by spreading the sides apart and forcing it downward over the guide beam until the lugs 74 clear the bottom side of the guide beam 62' on opposite sides of the transverse frame beam 12. The lugs then snap inwardly under the guide beam, on opposite sides of the frame beam, to secure the bearing against vertical and longitudinal displacement.

Each conveyor slat utilized in the formation of the elongated reciprocating conveyor is substantially the same length as the full length of the main frame, as will be understood. Thus, if the reciprocating conveyor assembly is to form the bed of a truck, the elongated slats will be substantially the full length of the truck bed. In the case of an in-plant industrial conveyor, the slats may be several hundred feet in length.

In any event, and as illustrated, each slat, shown as slat 52, is substantially C-shaped in cross section, having a top wall 76 preferably provided with a plurality of longitudinal friction-reducing loadsupporting ribs 78, laterally spaced side walls 80 and laterally spaced bottom guide flanges 82. It is wider than the bearing and its height is less than the distance between the upper surface of the top wall 70 of the bearing and the upper surface of the underlying transverse frame beam 12. The pair of guide flanges 82 project inward from each of the opposite side walls of the slat and define between their inner edges a longitudinal opening through out the length of the slat. The width of this opening is slightly greater than the outside width of the bearing.

The opposite side walls 72 of each bearing are provided with longitudinal ribs 84 which project laterally outward in an area intermediate the vertical height of the bearing side walls and inwardly of the bottom flanges 82 when the top surface 76 of the slat rests upon the top surface 70 of the bearing. The distance between the ribs 84 is greater than the width of the opening between the flanges 82. However, the ribs 84 are resilient and hence allow the slat to be installed upon the bearing by pushing downward on the slat to cause the flanges 82 to move downward past the ribs 84. The resilient ribs then recover their normal, expanded contour, overlying the inner surfaces of the flanges and thereby prevent upward displacement of the slat relative to the bearing while permitting longitudinal reciprocation of the slat relative to the bearing, with minimum frictional resistance.

The foregoing construction of bearings and slat greatly facilitates the assembly of the conveyor and disassembly of a slat for replacement of worn bearings. The construction also minimizes the cost of manufacture of the slats and bearings, since it allows formation of the slats by the economical extrusion of aluminum or other suitable material and the formation of the bearings by the extrusion of thermoplastic resin.

Also as disclosed in the copending application Ser. No. 469,523 previously mentioned, the arrangement of slats illustrated provides a substantially non-porous conveyor, so as to accommodate conveying of particulate material. For this purpose, a particularly effective seal is provided for sealing the space between adjacent slats. Referring particularly to FIG. 5 of the drawings, an elongated strip 90 of flexible material is secured removably to one side of each slat, by forming the strip with a laterally projecting dove-tail secton 92 and the corresponding vertical side wall of the slat is provided with a matching dove-tail groove 94. The sealing strip thus is secured removably to the slat by sliding the dove tail section longitudinally into the groove.

The sealing strip has an upper portion 90' which extends angularly upward and outward for sliding contact with the confronting vertical side wall of the adjacent slat, preferably near the upper edge thereof. This resilient engagement forms an effective seal between adjacent slats while permitting relative reciprocation thereof. Further, the weight of particulate material being conveyed on the slats tends to force the upper portion of the flexible sealing strip into positive, sliding engagement with the adjacent slat, to insure maintenance of the seal.

It is to be noted in FIG. 2 that when the modular drive unit is incorporated into the main frame as the longitudinal section thereof, a space exists at the opposite sides of the conveyor assembly into which particulate or other material may collect and not be conveyed. For this purpose elongated angular shields 100 are secured to the side walls 14 of the main frame and project angularly inward and downward to overlie the outboard conveyor slats and thus seal the marginal space.

From the foregoing, it will be appreciated that the modular drive unit of this invention facilitates the conversion of a conventional truck bed, or an in-plant belt or roller conveyor assembly to a reciprocating conveyor, with speed, facility and economy. The modular drive unit may be incorporated into any main supporting frame of any width or length to convert the latter to a reciprocating conveyor simply by providing the required number of conveyor slat members of appropriate length. The slat guides and associated non-friction bearings illustrated may be incorporated into the main frame to insure maximum freedom of reciprocative movement of all of the elongated slats, and corresponding maximum efficiency of operation of the conveyor, with minimum maintenance and repair.

It will be apparent to those skilled in the art that various changes may be made in the size, shape, type, number and arrangement of parts described hereinbefore without departing from the spirit of this invention.

Having now described my invention and the manner in which it may be used, I claim:

1. For use with an elongated main conveyor frame having longitudinal side beams and longitudinally spaced transverse beams and a plurality of elongated conveyor slats of substantially the same length as the main frame, a separate modular slat drive unit comprising:
   (a) a unitary framework including longitudinal and transverse frame members, the longitudinal frame members being substantially shorter than the main frame,
   (b) a plurality of transverse drive beam members mounted on the unitary framework in longitudinally spaced relation for reciprocation in the longitudinal direction of the unitary framework,
   (c) a source of drive power for each drive beam, interconnecting the associated drive beam and the unitary framework,
   (d) attachment means on the unitary framework for connection to the main frame for incorporating the unitary framework into a portion of the length of the main frame, and
   (e) connector means on each drive beam for securing thereto at least one of the elongated conveyor slats extending in the longitudinal direction of and beyond the unitary framework substantially to the opposite ends of the main frame.

2. In combination with an elongated main conveyor frame having longitudinal side beams and longitudinally spaced transverse beams and a plurality of elongated conveyor slats of substantially the same length as the main frame, a modular slat drive unit comprising:
   (a) a unitary framework including longitudinal and transverse frame members, the longitudinal frame members being substantially shorter than the main frame,
   (b) a plurality of transverse drive beam members mounted on the unitary framework in longitudinally spaced relation for reciprocation in the longitudinal direction of the unitary framework and main frame,
   (c) a source of drive power for each drive beam, interconnecting the associated drive beam and the unitary framework,
   (d) attachment means interconnecting the main frame and unitary framework and incorporating the unitary framework into a portion of the length of the main frame, and
   (e) connector means on each drive beam securing thereto at least one of the elongated conveyor slats extending in the longitudinal direction of and beyond the unitary framework substantially to the opposite ends of the main frame.

* * * * *

UNITED STATES PATENT AND TRADEMARK OFFICE
CERTIFICATE OF CORRECTION

PATENT NO. : 4,184,587
DATED : 22 January 1980
INVENTOR(S) : Olof A. Hallstrom

It is certified that error appears in the above-identified patent and that said Letters Patent are hereby corrected as shown below:

Column 1, line 25, "lor" should read --for--.

Column 4, line 55, after "as" insert --Teflon, Delrin,--.

Signed and Sealed this

Twenty-second Day of April 1980

[SEAL]

Attest:

SIDNEY A. DIAMOND

Attesting Officer    Commissioner of Patents and Trademarks